United States Patent
Rauma et al.

(10) Patent No.: US 11,273,721 B2
(45) Date of Patent: Mar. 15, 2022

(54) VESSEL WITH ELECTRIC POWER CONNECTORS

(71) Applicant: Danfoss Editron Oy, Lappeenranta (FI)

(72) Inventors: Kimmo Rauma, Lappeenranta (FI); Tero Jarvelainen, Lappeenranta (FI); Heikki Bergman, Sipoo (FI)

(73) Assignee: DANFOSS EDITRON OY, Lappeenranta (FI)

(*) Notice: Subject to any disclaimer, the term of this patent is extended or adjusted under 35 U.S.C. 154(b) by 0 days.

(21) Appl. No.: 16/502,397

(22) Filed: Jul. 3, 2019

(65) Prior Publication Data
US 2019/0322184 A1 Oct. 24, 2019

Related U.S. Application Data

(62) Division of application No. 15/478,646, filed on Apr. 4, 2017, now Pat. No. 10,850,628.

(30) Foreign Application Priority Data

Apr. 5, 2016 (EP) .................................. 16163770

(51) Int. Cl.
  *B60L 53/14* (2019.01)
  *B60L 53/30* (2019.01)
  (Continued)

(52) U.S. Cl.
  CPC ............... *B60L 53/14* (2019.02); *B60L 53/20* (2019.02); *B60L 53/30* (2019.02); *B60L 53/31* (2019.02);
  (Continued)

(58) Field of Classification Search
  CPC ...... B60L 11/1824; B60L 50/40; B60L 53/14; B60L 53/20; B60L 53/31; B60L 53/60;
  (Continued)

(56) References Cited

U.S. PATENT DOCUMENTS

2004/0044452 A1* 3/2004 Bauer .................. B60L 53/305
                                                      701/31.4
2012/0032519 A1 2/2012 Watts
(Continued)

FOREIGN PATENT DOCUMENTS

CN 102120488 A 7/2011
CN 202016568 U 10/2011
(Continued)

OTHER PUBLICATIONS

EP Search Report, dated Sep. 8, 2016, from corresponding EP application.
(Continued)

*Primary Examiner* — Toan T Vu
(74) *Attorney, Agent, or Firm* — Nixon & Vanderhye

(57) ABSTRACT

A vessel includes electric connectors for receiving one or more direct voltages from a shore-side electric power system. The vessel includes a transmitter for transmitting, to the shore-side electric power system, a control signal enabling the shore-side electric power system to control the one or more direct voltages to be suitable for the vessel. Alternatively, the vessel includes one or more controllable direct voltage converters and a control system for controlling the one or more controllable direct voltage converters to convert the one or more direct voltages into one or more direct voltages suitable for the vessel. The vessel can be for example a ship, a boat, or a ferry.

2 Claims, 2 Drawing Sheets

(51) Int. Cl.
  *B60L 53/31* (2019.01)
  *B60L 53/60* (2019.01)
  *B60L 53/20* (2019.01)
  *B63H 21/17* (2006.01)
  *B63J 3/02* (2006.01)
  *H02J 7/00* (2006.01)
  *H02J 4/00* (2006.01)

(52) U.S. Cl.
  CPC ............... *B63H 21/17* (2013.01); *H02J 4/00* (2013.01); *H02J 7/0013* (2013.01); *B60L 2200/32* (2013.01); *B63J 3/02* (2013.01); *Y02T 10/70* (2013.01); *Y02T 10/7072* (2013.01); *Y02T 90/12* (2013.01); *Y02T 90/14* (2013.01); *Y02T 90/16* (2013.01)

(58) Field of Classification Search
  CPC .......... B60L 2200/32; B60L 2240/527; B60L 2240/529; B60L 53/30; B63H 21/17; H02H 3/087; H02J 1/00; H02J 1/10; H02J 4/00; H02J 5/00; H02J 7/0013; H02J 1/082; H02J 2310/42; B63J 2003/043; B63J 3/02; Y02T 10/70; Y02T 10/7072; Y02T 90/12; Y02T 90/14; Y02T 90/16
  USPC .................................................. 307/9.1, 10.1
  See application file for complete search history.

(56) References Cited

U.S. PATENT DOCUMENTS

| | | | | |
|---|---|---|---|---|
| 2012/0106672 | A1* | 5/2012 | Shelton | B60L 53/65 375/295 |
| 2012/0309242 | A1* | 12/2012 | Haugland | H02J 3/36 440/3 |
| 2014/0077607 | A1* | 3/2014 | Clarke | H02J 7/0045 307/75 |
| 2018/0001777 | A1* | 1/2018 | Kilic | B60L 53/37 |

FOREIGN PATENT DOCUMENTS

| | | | |
|---|---|---|---|
| CN | 102246381 | A | 11/2011 |
| CN | 106816874 | * | 1/2016 |
| CN | 105356608 | A | 2/2016 |
| CN | 205070420 | U | 3/2016 |
| DE | 10 2006 024594 | A1 | 11/2007 |
| EP | 2 458 724 | A1 | 5/2012 |
| JP | 2010-115009 | A | 5/2010 |
| JP | 2014-108673 | A | 6/2014 |
| TW | M448087 | U1 | 3/2013 |
| WO | WO2007-060189 | A1 | 5/2007 |
| WO | WO 2010/091743 | | 8/2010 |
| WO | WO2010091743 | * | 8/2010 |
| WO | 2013/175061 | A1 | 11/2013 |
| WO | WO 2015/071721 | | 5/2015 |

OTHER PUBLICATIONS

Office Action issued in Taiwanese Patent Application No. 106111110 dated May 24, 2021.
Office Action issued in Chinese Patent Application No. 201710264233.6 dated Jul. 28, 2021.
Office Action issued in Korean Patent Application No. 10-2017-0039854 dated Oct. 22, 2021.

* cited by examiner

VESSEL WITH ELECTRIC POWER CONNECTORS

CROSS REFERENCE TO RELATED APPLICATIONS

This application is a divisional of application Ser. No. 15/478,646 filed on Apr. 4, 2017, which claims foreign priority to European Patent Office Application No. 16163770.7, filed on Apr. 5, 2016. The entire content of the above applications are hereby incorporated by reference.

FIELD OF THE DISCLOSURE

The disclosure relates to a vessel capable of receiving electric power from a shore-side electric power system. The vessel that can be, for example but not necessarily, a ship, a boat, or a ferry.

BACKGROUND

In many cases there is a need to supply electric power from shore-side to a vessel when the vessel is at a berth. The vessel can be for example an electric vessel that comprises a chargeable battery system and an electric propulsion system energized by the chargeable battery system. It is also possible that the vessel is a conventional combustion engine vessel, and the vessel is connected to a shore-side alternating voltage network instead of using auxiliary generators of the vessel for producing the electricity needed when the vessel is at a berth.

It is not always possible to connect the shore-side alternating voltage network to the on-board alternating voltage network of the vessel as the vessel may use different frequency and/or voltage level than the shore-side alternating voltage network. For example, the frequency of 50 Hz is used in Europe whereas the frequency of 60 Hz is used in North America. In cases where the above-mentioned alternating voltage networks can be connected to each other, a berthing time can relatively long because of the required synchronization and phase-order check between the alternating voltage networks.

Publication WO2007060189 describes a known solution to connect a shore-side alternating voltage network to a vessel. In this solution, a converter is installed on board. The on-board converter is connected to the shore-side alternating voltage network through a cable. The on-board converter is typically a frequency converter for converting the alternating voltage received from the shore-side into alternating voltage having a voltage level and frequency suitable for the alternating voltage network of the vessel. It is also possible that the on-board converter is a rectifier for converting the alternating voltage received from the shore-side into direct voltage having a voltage level suitable for the vessel, e.g. for charging batteries of the vessel. A potential challenge related to this approach is that the input voltage range of the on-board converter may not be enough for voltage levels used in different ports. This situation may occur especially when the vessel sails all over the world.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with a first aspect of the invention, there is provided a new vessel that comprises:
  electric connectors for receiving one or more direct voltages from a shore-side electric power system, and
  a transmitter for transmitting, to the shore-side electric power system, a control signal enabling the shore-side electric power system to control the one or more direct voltages to be suitable for the vessel.

The control signal that is communicated from the vessel to the shore-side electric power system enables the shore-side electric power system to adapt itself in accordance with the needs of the vessel. The control signal can be an analog or digital signal that is transferred from the vessel to the shore-side electric power system with the aid of e.g. a radio link, an electric signal cable, or an optical fiber.

In an exemplifying case where the control signal is a digital signal, the transfer of the control signal can be carried out in accordance with one or more digital data transfer protocols such as for example the Internet Protocol "IP", the Ethernet protocol, the Asynchronous Transfer Mode "ATM" protocol, and/or the MultiProtocol Label Switching "MPLS". For example, the Internet of Things "IoT" technology can be utilized for arranging the transfer of control signals and possible other data transfer in cases where a port comprises many electric power systems of the kind described above and there are many vessels which simultaneously receive electric power from the electric power systems.

In accordance with a second aspect of the invention, there is provided a new vessel that comprises:
  electric connectors for receiving one or more direct voltages from a shore-side electric power system,
  one or more controllable direct voltage converters, and
  a control system for controlling the one or more controllable direct voltage converters to convert the one or more direct voltages into one or more direct voltages suitable for the vessel.

Each controllable direct voltage converter, i.e. a controllable DC-DC converter, can be for example a buck and/or boost converter. In many cases, a controllable DC-DC converter can be arranged to support a broad input voltage range more cost effectively than is a case with a controllable rectifier for converting alternating voltage into controllable direct voltage.

A vessel according to the invention can be for example a ship, a boat, or a ferry.

A vessel according to an exemplifying and non-limiting embodiment of the invention comprises a chargeable battery system for receiving charging energy from the electric connectors of the vessel and for supplying electric power to the propulsion system of the vessel.

Exemplifying and non-limiting embodiments of the invention are described in accompanied dependent claims.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF THE FIGURES

Exemplifying and non-limiting embodiments of the invention and their advantages are explained in greater detail below in the sense of examples and with reference to the accompanying drawings, in which.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

Figure 1:
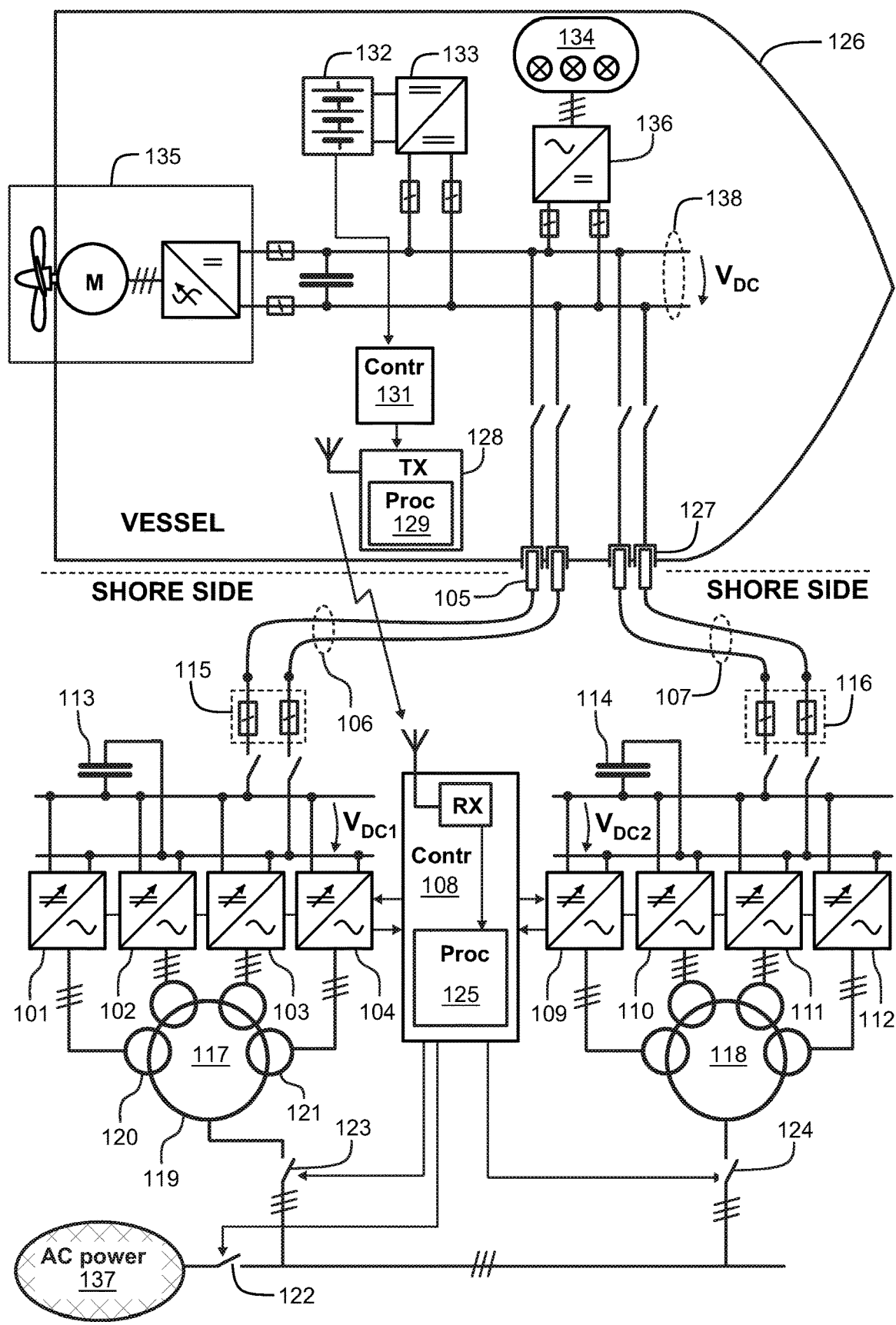
FIG. 1 illustrates a vessel according to an exemplifying and non-limiting embodiment of the invention and a shore-side electric power system for supplying electric power to the vessel.

FIG. 1 illustrates a vessel 126 according to an exemplifying and non-limiting embodiment of the invention and an electric power system for supplying electric power to the vessel 126. The vessel 126 can be for example a ship, a boat, or a ferry. The electric power system is located on the shore-side. The electric power system comprises controllable converters 101, 102, 103, 104, 109, 110, 111, and 112. The controllable converters 101, 102, 103, and 104 are arranged to receive electric energy from a shore-side alternating voltage network 137 and to produce direct voltage $V_{DC1}$. Correspondingly, the controllable converters 109, 110, 111, and 112 are arranged to receive electric energy from the shore-side alternating voltage network 137 and to produce direct voltage $V_{DC2}$. The electric power system comprises electric connectors for connecting to an electric circuitry of the vessel 126. In FIG. 1, one of the electric connectors of the electric power system is denoted with a reference 105. The electric power system comprises direct voltage links 106 and 107 for transferring the direct voltages $V_{DC1}$ and $V_{DC2}$ from the controllable converters 101-104 and 109-112 to the above-mentioned electric connectors. The direct voltage links 106 and 107 may comprise for example bendable cables. The electric power system comprises a control system 108 for receiving a control signal from the vessel 126 and for controlling the controllable converters 101-104 and 109-112 in accordance with the received control signal so as to control the direct voltages $V_{DC1}$ and $V_{DC2}$ to be suitable for the vessel 126. In the exemplifying case illustrated in FIG. 1, there are two groups of controllable converters so that each group comprises four controllable converters. It is however clear to a skilled person that many different system architectures are possible, e.g. there can be only one group or more than two groups and each group may comprise one or more converter devices. A "group" having a single member is understood here as a special case of a group. Furthermore it is possible that different groups have different number of converter devices. In each case, the system architecture may depend on several factors such as e.g. the charge power need, the shore-side alternating voltage network, factors related to cost efficiency, etc.

The vessel 126 comprises electric connectors for receiving the above-mentioned direct voltages $V_{DC1}$ and $V_{DC2}$ from the above-mentioned direct voltage links 106 and 107. In FIG. 1, one of the electric connectors of the vessel 126 is denoted with a reference 127. The vessel 126 comprises a transmitter 128 for transmitting, to the above-mentioned electric power system, the above-mentioned control signal so as to enable the electric power system to control the direct voltages $V_{DC1}$ and $V_{DC2}$ to be suitable for the vessel 126. In this exemplifying case, the vessel 126 is an electric vessel that comprises a chargeable battery system 132 for receiving charging energy from the electric connectors of the vessel and for supplying electric power to a propulsion system 135 of the vessel. The vessel 126 comprises a control system 131 for determining the above-mentioned control signal in accordance with e.g. the state of charge of the chargeable battery system 132 and/or in accordance with other information such as e.g. one or more predetermined control parameters. A control parameter may indicate for example a reference value for direct voltage $V_{DC}$ of a direct voltage link 138 of the vessel 126. In the exemplifying case illustrated in FIG. 1, the vessel comprises a direct voltage converter 133 between the direct voltage link 138 and the chargeable battery system 132. The direct voltage converter 133 is advantageously controllable so that the direct voltage $V_{DC}$ of the direct voltage link 138 can be kept substantially constant even if the voltage of the chargeable battery system 132 were changing. Furthermore, the vessel 126 may comprise an inverter 136 for converting the direct voltage $V_{DC}$ of the direct voltage link 138 into one or more alternating voltages suitable for an alternating voltage system 134 of the vessel.

In the exemplifying case illustrated in FIG. 1, the above-mentioned control signal is transferred from the vessel 126 to the electric power system on the shore-side with the aid of a radio link. In this exemplifying case, the transmitter 128 of the vessel 126 comprises a radio transmitter and the control system 108 on the shore-side comprises a radio receiver. It is, however, also possible that the control signal is transferred from the vessel 126 to the electric power system on the shore-side with the aid of an electric signal cable or an optical fiber. The control signal can be an analog signal, and the control system 108 can be configured to be responsive to the level, frequency, phase, and/or other properties of the control signal. It is also possible that the control signal is a digital signal. In exemplifying cases where the control signal is a digital signal, the transmitter 128 of the vessel comprises a modulator and the receiver of the control system 108 comprises a corresponding demodulator so as to enable the transfer of the digital control signal from the vessel 126 to the electric power system on the shore-side.

The above-mentioned control system 108 may comprise for example a communication protocol processor 125 for controlling the reception of the control signal in accordance with one or more digital data transfer protocols. Correspondingly, the transmitter 128 of the vessel 126 may comprise a communication protocol processor 129 for controlling the transmission of the control signal in accordance with the one or more digital data transfer protocols. The one or more digital data transfer protocols may comprise for example the Internet Protocol "IP", Ethernet protocol, the Asynchronous Transfer Mode "ATM" protocol, and/or the MultiProtocol Label Switching "MPLS".

The exemplifying electric power system illustrated in FIG. 1 comprises capacitive energy-storages 113 and 114. The capacitive energy-storage 113 is connected to the direct voltage terminals of the controllable converters 101-104, and the capacitive energy-storage 114 is connected to the direct voltage terminals of the controllable converters 109-112. Each of the capacitive energy storages 113 and 114 may comprise for example one or more electric double layer capacitors "EDLC" which can be called also "super capacitors".

In the exemplifying electric power system illustrated in FIG. 1, the direct voltage link 106 comprises an over-current protector 115 and the direct voltage link 107 comprises an over-current protector 116. Each over-current protector can be for example a fuse or an over-current protector relay or another protector circuit breaker.

The exemplifying electric power system illustrated in FIG. 1 comprises a transformer 117 for connecting the controllable converters 101-104 to the shore-side alternating voltage network 137, and another transformer 118 for connecting the controllable converters 109-112 to the shore-side alternating voltage network 137. Each of the transformers comprises a three-phase primary winding for being connected to the shore-side alternating voltage network 137 and four three-phase secondary windings each being connected to a respective one of the controllable converters. In FIG. 1, the three-phase primary winding of the transformer 117 is denoted with a reference 119 and two of the three-phase secondary windings of the transformer 117 are denoted with references 120 and 121.

The exemplifying electric power system illustrated in FIG. 1 comprises supply breakers 122, 123, and 124 for interrupting the electric power supply from the shore-side alternating voltage network 137 to the controllable converters 101-104 and/or to the controllable converters 109-112. The supply breakers can be controlled e.g. by the control system 108 so that the electric power supply from the shore-side alternating voltage network 137 to the controllable converters 101-104 and/or 109-112 is interrupted in response to a fault situation in the controllable converters 101-104 and/or 109-112.

Figure 2:
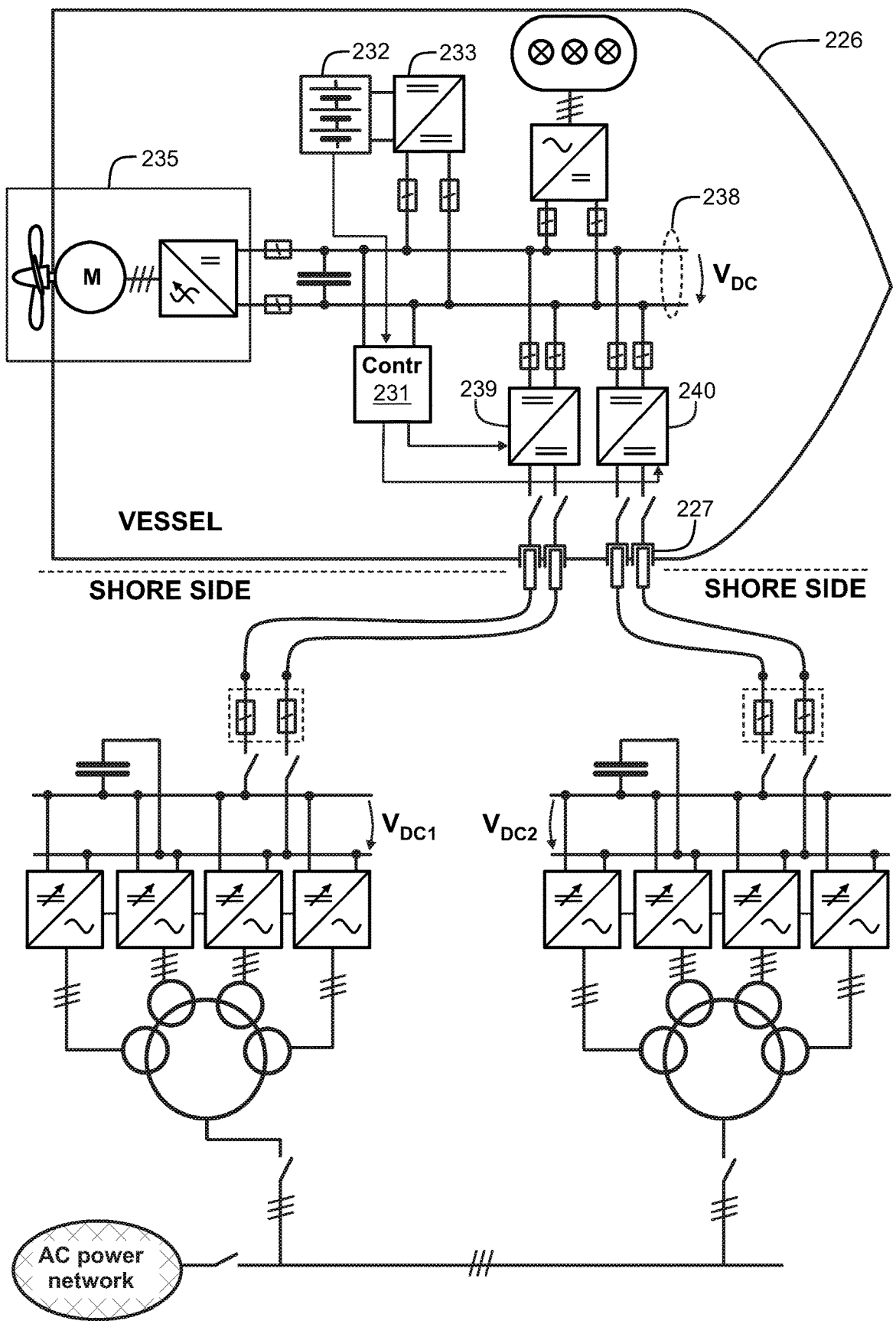
FIG. 2 illustrates a vessel according to an exemplifying and non-limiting embodiment of the invention and a shore-side electric power system for supplying electric power to the vessel.

FIG. 2 shows a schematic illustration of a vessel 226 according to an exemplifying and non-limiting embodiment of the invention. The vessel 226 comprises electric connectors for receiving direct voltages $V_{DC1}$ and $V_{DC2}$ from a shore-side electric power system. In FIG. 2, one of the electric connectors is denoted with a reference 227. The vessel 226 comprises controllable direct voltage converters 239 and 240, and a control system 231 for controlling the direct voltage converters 239 and 240 so that the received direct voltages $V_{DC1}$ and $V_{DC2}$ are converted to be suitable for the vessel 226. Each of the direct voltage converters 239 and 240 can be for example a buck and/or boost converter. Usually, a buck and/or boost converter can be arranged to support a broad input voltage range more cost effectively than is a case with a controllable rectifier for converting alternating voltage into controllable direct voltage.

The vessel 226 is an electric vessel that comprises a chargeable battery system 232 for receiving charging energy from the electric connectors of the vessel and for supplying electric power to a propulsion system 235 of the vessel. The control system 231 can be configured to control the direct voltage converters 239 and 240 in accordance with e.g. the state of charge of the chargeable battery system 232 and/or in accordance with other information such as e.g. one or more predetermined control parameters. A control parameter may indicate for example a reference value for direct voltage $V_{DC}$ of a direct voltage link 238 of the vessel 226. In the exemplifying case illustrated in FIG. 2, the vessel comprises a direct voltage converter 233 between the direct voltage link 238 and the chargeable battery system 232. The direct voltage converter 233 is advantageously controllable so that the direct voltage $V_{DC}$ of the direct voltage link 238 can be kept substantially constant even if the voltage of the chargeable battery system 232 were changing.

Each of the above-mentioned control systems 131, 108, and 231 can be implemented with one or more processor circuits each of which can be a programmable processor circuit provided with appropriate software, a dedicated hardware processor such as for example an application specific integrated circuit "ASIC", or a configurable hardware processor such as for example a field programmable gate array "FPGA". Furthermore, each of the above-mentioned control systems may comprise one or more memory circuits such as e.g. a Random-Access Memory "RAM" circuit.

The specific examples provided in the description given above should not be construed as limiting the applicability and/or the interpretation of the appended claims. Lists and groups of examples provided in the description given above are not exhaustive unless otherwise explicitly stated.

What is claimed is:

1. A vessel comprising:
   electric connectors configured to receive direct voltages from a shore-side electric power system, the direct voltages being different from each other;
   controllable direct voltage converters; and
   a control system configured to control the controllable direct voltage converters to convert the received direct voltages into one direct voltage suitable for the vessel.

2. The vessel according to claim 1, further comprising a chargeable battery system configured to receive charging energy from the electric connectors of the vessel and configured to supply electric power to a propulsion system of the vessel.

* * * * *